United States Patent [19]

Matsumura et al.

[11] Patent Number: 5,400,260
[45] Date of Patent: Mar. 21, 1995

[54] METHOD OF CREATING MACHINING CONDITIONS FOR NC MACHINE TOOLS

[75] Inventors: Teruyuki Matsumura, Hachioji; Yuji Deguchi; Kota Miyamoto, both of Oshino, Japan

[73] Assignee: Fanuc Ltd., Minamitsuru, Japan

[21] Appl. No.: 157,070

[22] PCT Filed: Mar. 25, 1993

[86] PCT No.: PCT/JP93/00361
§ 371 Date: Jan. 31, 1994
§ 102(e) Date: Jan. 31, 1994

[87] PCT Pub. No.: WO93/19894
PCT Pub. Date: Oct. 14, 1993

[30] Foreign Application Priority Data
Mar. 31, 1992 [JP] Japan .................. 4-103917

[51] Int. Cl.⁶ .................. G06F 15/46; G05B 19/18
[52] U.S. Cl. .................. 364/474.22; 364/474.21; 318/568.1
[58] Field of Search .................. 364/474.22–474.27, 364/474.16, 474.17, 474.21, 191–193; 318/568.1

[56] References Cited

U.S. PATENT DOCUMENTS

| | | | |
|---|---|---|---|
| 4,446,525 | 5/1984 | Hoch et al. | 364/474 |
| 4,584,649 | 4/1986 | Komanduri et al. | 364/474.14 X |
| 4,636,938 | 1/1987 | Broome | 364/474.22 X |
| 4,887,221 | 12/1989 | Davis et al. | 364/474.24 X |
| 4,992,948 | 2/1991 | Pilland et al. | 364/474.22 X |
| 5,289,382 | 2/1994 | Goto | 364/474.21 |

FOREIGN PATENT DOCUMENTS

| | | |
|---|---|---|
| 0311703 | 4/1989 | European Pat. Off. . |
| 0476137 | 3/1992 | European Pat. Off. . |
| 3437340 | 4/1986 | Germany . |
| 58-82646 | 5/1983 | Japan . |
| 58-132439 | 8/1983 | Japan . |
| 51-168008 | 7/1986 | Japan . |

OTHER PUBLICATIONS

English Translation of International Search Report mailed Jun. 29, 1993.

Primary Examiner—Joseph Ruggiero
Attorney, Agent, or Firm—Staas & Halsey

[57] ABSTRACT

A method of generating machining conditions for a numerically controlled machine tool in which a machining is under proper machining conditions without altering the initial machining program even when it has become necessary to change the material of workpiece after completing a machining program. The method comprises the steps of dividing a function for determining machining conditions including a spindle rotational speed and a tool feed speed into a first part of the function independent of the material of a workpiece and a second part of the function dependent on the material of the workpiece. More specifically, when creating a machining program, only the first part of the function is retained in a storage medium as reference values for machining conditions together with the machining program, and, at the stage of executing the machining program, setting the second part of the function is set into a numerical control system by designating the material of the workpiece so that the first and the second parts of the function are synthesized to generate machining conditions.

10 Claims, 6 Drawing Sheets

FIG. 3a
STORAGE AREA 1

| SPINDLE ROTATIONAL SPEED COEFFICIENT | C (m/mm/ π) |
|---|---|

FIG. 3b
STORAGE AREA 2 (FILE)

| MATERIAL OF WORKPIECE | CORRECTION VALUE (W) | CORRECTION VALUE (W') |
|---|---|---|
| ALUMINUM | w 1 | w' 1 |
| KROMAX | w 2 | w' 2 |
| STAVAX | w 3 | w' 3 |
| ⋮ | ⋮ | ⋮ |

FIG. 3c
STORAGE AREA 3 (FILE)

| NAME OF PROCESS | ROTATIONAL SPEED RATIO (K) | FEED SPEED RATIO (K') |
|---|---|---|
| ROUGH MACHINING | k 1 (=1) | k' 1 (=1) |
| MEDIUM MACHINING | k 2 | k' 2 |
| FINISH | k 3 | k' 3 |
| ⋮ | ⋮ | ⋮ |

FIG. 3d
STORAGE AREA 4 (FILE)

| NAME OF TOOL | STANDARD CUTTING SPEED (V) m/min. | TOOL DIAMETER (E) mm | STANDARD FEED SPEED (V') m/min. |
|---|---|---|---|
| T1 | v 1 | e 1 | v' 1 |
| T2 | v 2 | e 2 | v' 2 |
| T3 | v 3 | e 3 | v' 3 |
| ⋮ | ⋮ | ⋮ | ⋮ |

METHOD OF CREATING MACHINING CONDITIONS FOR NC MACHINE TOOLS

BACKGROUND OF THE INVENTION

1. Field of the Invention

The present invention relates to a method of creating machining conditions required for machining by a numerically controlled machine tool.

2. Description of the Related Art

An NC (numerical control) automatic programming system is known which, in generating a machining program for a numerically controlled machine tool, automatically computes machining conditions such as a spindle rotational speed and a tool feed speed in accordance with materials of the workpiece and preserves them together with the machining program.

In some conventional NC automatic programming systems in general use, a machining program is not allowed to be generated until all data required for obtaining machining conditions are definitely specified and inputted into the system after the designation of a material of the workpiece. Particularly, in interactive automatic programming systems with a display screen displaying questions to request the operator for an input operation, the subsequent operations are not permitted in the absence of an input operation upon the request to input a material of the workpiece.

In the interactive automatic programming systems, all data necessary for generating a machining program inputted by the operator are converted into a machining program at a time through an operating system. Therefore, all the machining conditions to be finally outputted to a floppy disk or a punch tape for storage include elements associated with the material of the workpiece which has been specified at the stage of interactive data input.

For example, in such a case where the material of the workpiece has to be changed due to design change after the preparation of a machining program has been completed, it is not possible to execute proper machining under the machining conditions determined based on the initial data for the material of the workpiece which has been specified through the data input operation. Thus, it will become necessary for the machining conditions to be modified according to a newly selected material of the workpiece. In order to execute such modification by using the conventional NC automatic programming system or a controller for the NC machine tool, the original data inputted by the operator in creating the machining program has to be invoked once on the display screen of the NC automatic programming system, and, after modifying the part of the program associated with the material of the workpiece, the program is required to be reconverted into an NC data. Alternatively, after invoking the initial machining program on the display screen of the NC machine tool controller to detect commands associated with the spindle rotational speed, the tool feed speed and the like while referring to the screen, new spindle rotational speed, tool feed speed and the like have to be calculated manually for resetting. Thus, the modification associated with the change of material will involve an extremely time-consuming operation.

The same is also true of the case where the initial machining program is directly coded into a punch tape or the like without using the interactive automatic programming system. Thus, the operation for the modification of machining conditions inevitably includes the steps of invoking the initial machining program into the controller of the NC machine tool, detecting commands associated with the spindle rotational speed, tool feed speed and the like while referring to the display screen, and manually calculating new modified values.

SUMMARY OF THE INVENTION

The present invention provides a method of creating machining conditions for an NC machine tool designed so that, even when it has become necessary to change the material of a workpiece after completing a machining program, machining can be executed under machining conditions suitable for a newly selected material for the workpiece by a simple operation, which will not require the alteration of the initial machining program.

A method for creating machining conditions for a numerically controlled machine tool according to the present invention comprises the steps of: dividing a function for determining the machining conditions into a first part of the function independent of materials of the workpiece and a second part of the function dependent on the materials of the workpiece; determining the first part of the function when generating a machining program by an automatic programming system and preserving it together with the generated machining program; determining the second part of the function when executing the machining program by a numerical control system; and synthesizing thus determined first part of the function and thus determined second part of the function to create machining conditions.

Further, according to the method of the present invention, the machining program preserving the first part of the function is inputted into the automatic programming system, while the second part of the function is provided to the automatic programming system before executing the machining program by the numerical control system, thereby synthesizing the first and second parts of the function to create machining conditions.

BRIEF DESCRIPTION OF DRAWINGS

FIGS. 3a to 3d are conceptual diagrams showing files for storing components of functions for determining machining conditions including a spindle rotational speed and a tool feed speed;

DETAILED DESCRIPTION OF THE PREFERRED EMBODIMENTS

Figure 1:
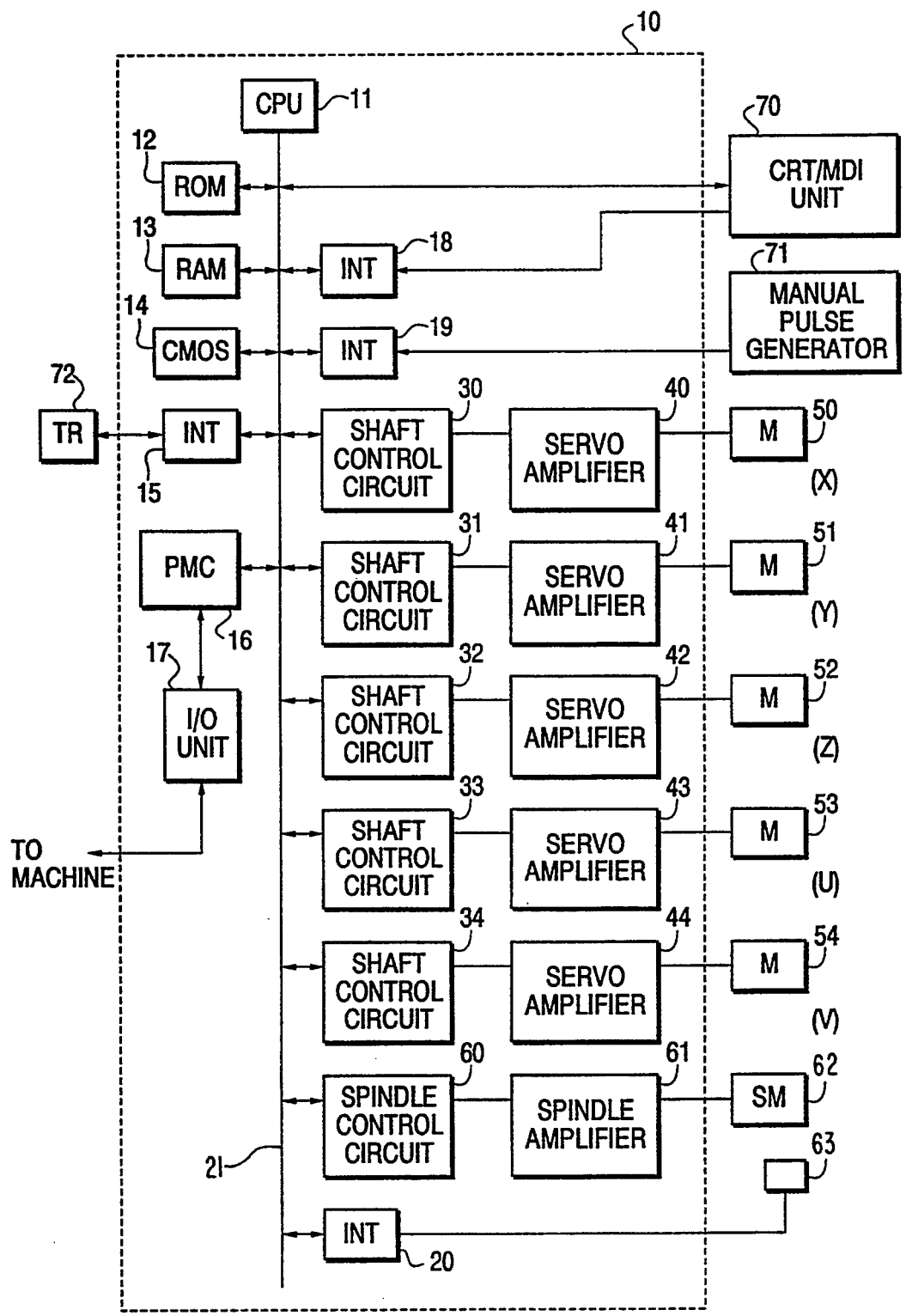
FIG. 1 is a block diagram showing a major part of a controller of a numerically controlled (NC) machine tool for embodying a method according to the present invention.
Figure 2:
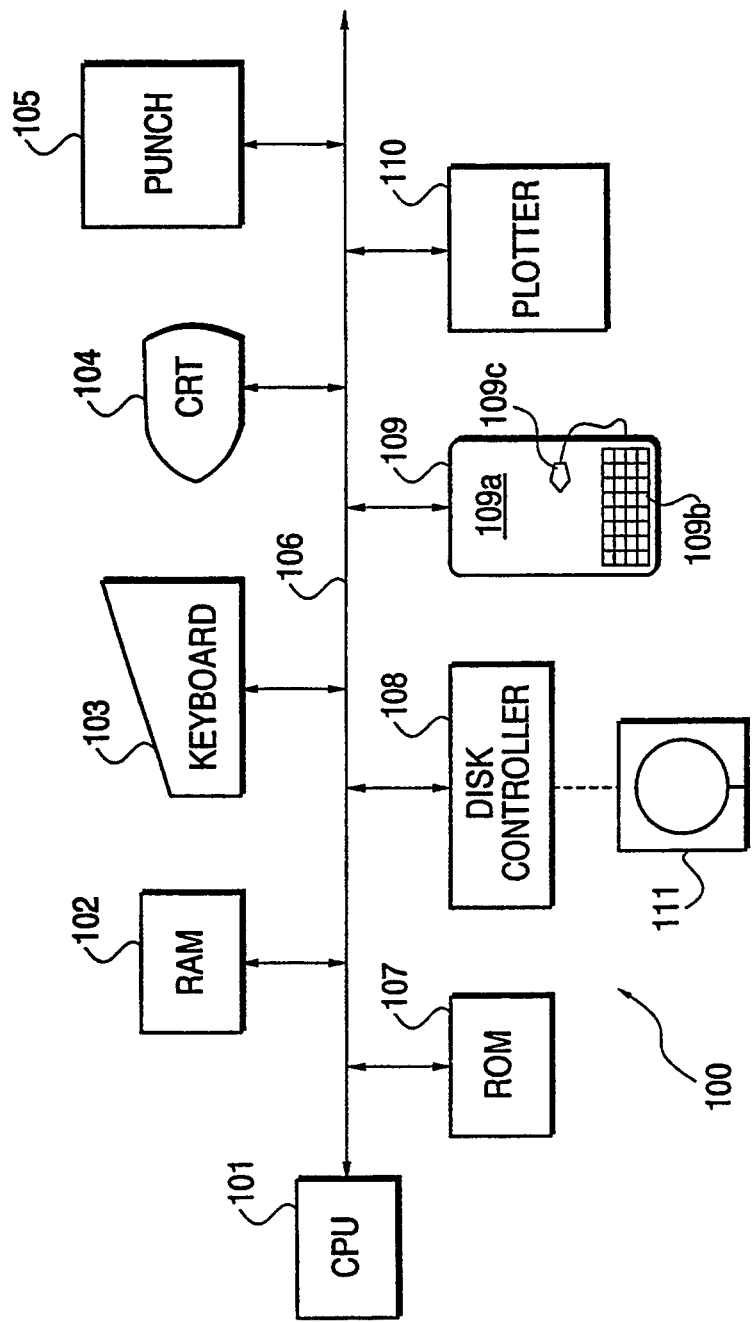
FIG. 2 is a block diagram showing a major part of an NC automatic programming system for embodying a method according to the present invention.

Referring now to FIGS. 1 and 2, description will be given of a controller for a numerically controlled (NC) machine tool which executes a method of the present invention and an NC automatic programming system associated therewith.

The controller 10 in FIG. 1 comprises a CPU (central processing unit) 11 serving as a processor for controlling the entirety of the controller 10.

The CPU 11 reads by way of a bus 21 a system program stored within a ROM (read only memory) 12, and in accordance with the system program controls the controller 10 throughout.

A RAM (random access memory) 13 stores temporary calculation data or display data, and various data inputted by the operator through a CRT/MDI unit 70.

A CMOS (complementary metal-oxide semiconductor) memory 14 is backed up by a battery, which is not shown, and serves as a non-volatile memory capable of retaining data even while electrical power to the controller 10 is turned off.

An interface 15 is connected to an external device 72, which actually is an external storage means consisting, for example, of a paper tape and a paper tape reader/punch, or of a floppy disk and its drive. The controller 10 is capable of reading through the paper tape reader or the floppy disk drive various machining programs including a program prepared, for example, by an NC automatic programming system 100 (FIG. 2), and is also capable of outputting tile machining programs edited within the controller 10 to the paper tape puncher or the floppy disk drive.

A PMC (programmable machine controller) 16 controls, in response to sequence programs internally stored within the controller 10, auxiliary equipment associated with the machine tool such as an actuator of a robot hand for replacing tools. More specifically, the PMC 16 provides a means for producing, through the sequence programs, signals necessary for the auxiliary equipment based on M-function (miscellaneous function), S-function (spindle speed function) and T function (tool function) specified by the machining program, as well as for outputting the signals through an I/O unit 17 to the side of the auxiliary equipment. Thus, the output signals cause the auxiliary equipment, such as various actuators, to be activated. The PMC 16 further receives signals derived from limit switches installed on the machine tool body or the auxiliary equipment and signals from various switches on a console panel installed on the machine tool, and, after undergoing necessary processing, delivers the signals to the CPU 11.

Image signals for current positions of various axes of machine tool, alarms, parameters and image data are transmitted to the CRT/MDI unit 70, and are shown on its display. The CRT/MDI unit 70 is a manual data entry device having display, keyboard, etc.

An interface 18 receives data from the keyboard of the CRT/MDI unit 70, and delivers the received data to the CPU 11. An interface 19 is connected to a manual pulse generator 71, and receives pulses therefrom. The manual pulse generator 71 is mounted on the console panel of the machine tool body, and is used to precisely position movable elements of the machine tool by controlling the shafts through manually operated distribution pulses.

Shaft control circuits 30, 31, 32, 33, and 34 receive displacement commands for the respective shafts from the CPU 11 and output the displacement commands to corresponding servo amplifiers 40, 41, 42, 43, 44, respectively. Responding to thus received commands, the servo amplifiers 40, 41, 42, 43 and 44 drive servo motors 50, 51, 52, 53, and 54, respectively. The servo motors 50, 51, 52, 53 and 54 associated with shafts X, Y, Z, U and V, respectively, incorporates pulse coders for the detection of shaft positions, positional signals from which are fed back to the respective shaft control circuits 30, 31, 32, 33 and 34 in the form of a pulse train. A linear scale may be used as a position detector depending on the situation. The pulse train may be processed for an F/V (frequency/velocity) conversion to produce velocity signals. The feedback of these positional signals and the velocity feedback are not shown in FIG. 1.

Spindle control circuit 60 receives a spindle rotational speed command from the CPU 11 to output a spindle speed signal to a spindle amplifier 61. The spindle amplifier 61 receives the spindle speed signal to rotate a spindle motor 62 at a specified rotational speed. An orientation command is used to position a spindle at a predetermined point. The spindle motor 62 is coupled via gears or a belt to a position coder 63, which generates a feedback pulse in unison with the rotation of the spindle, the feedback pulse being read by the CPU 11 through an interface 20. Although the controller 10 of a milling machine in the embodiment shown has five shafts corresponding to the respective shaft control circuits 30 through 34 and servo amplifiers 40 through 44, the number of the servo amplifiers and the servomotors depends on the type of the machine tool. The constitutions of the hardware of the controller 10 and the machine tool are substantially the same as those in the prior art, and hence the descriptions of the details are omitted.

The NC automatic programming system 100 shown in FIG. 2 comprises a CPU 101; a ROM 107 which stores a control program for the automatic programming system 100; a RAM 102 which stores system programs, various data or the like loaded from a floppy disk 111; a keyboard 103; a cathode ray tube (CRT) display 104 serving as an interactive screen; a tablet 109; a disc controller 108; a floppy disc 111 storing a system program, etc.; X-Y plotter 110 for outputting drafted drawings; and paper tape puncher 105 for outputting prepared machining program as a punched tape, the above elements being connected to each other through a bus 106.

The tablet 109 includes a screen-corresponding area 109a, a menu 109b and a tablet cursor 109c. When the operator moves the tablet cursor 109c within the screen-corresponding area 109a, a graphic cursor appearing on the CRT 104 is caused to move for specifying any desired position on the display screen of the CRT 104. Further, by moving the tablet cursor 109c on the menu 109b for designation, various menu items can be selected from the system program prepared within the floppy disk 111.

In creating a machining program in interactive mode using the NC automatic programming system 100, when the operator operates the keyboard 103 or the tablet 109 to select a system program for machining definition to activate the CPU 101, a screen for setting a process definition appears on the CRT 104. When the operator inputs the name of a desired machining process and the names of tools to be used, followed by the machining data including cutting direction and cutting area, these input data are collectively converted into a machining program through an operating system of the system program, and supplied to the floppy disk 111, the punch tape or the like.

A machining program of an NC language level may be directly created for the output to the floppy disk 111 or punched tape by coding through the keyboard 103, a rotational speed of the spindle for driving tools such as an end mill, commands for tool displacement including cutting feed and fast feed, an interpolating command and coordinate data for the tool path.

The constitution, general functions and the like of the NC automatic programming system 10 are substantially the same as those in the prior art, and hence the descriptions of their details will be omitted.

The following description is concerned with the functions determining machining conditions including the spindle rotational speed and the tool feed speed of a milling machine as an example of NC machine tool.

The function for determining spindle rotational speed S(rpm) is given as:

$$S=(K \cdot C \cdot V/E) \cdot W \qquad (1)$$

where K represents rotational speed ratio (absolute number); C, spindle rotational speed coefficient [m/(mm. $\pi$)]; V, standard cutting speed of a tool used (m/min.); E, tool diameter (mm); and W, a correction value corresponding to the material of the workpiece (absolute number).

The rotational speed ratio K in the expression (1) is a coefficient of the spindle rotational speed to be adjusted in accordance with the machining processes such as rough machining, medium finish, and finish, which is defined as 1 in the rough machining process, and is increased accordingly as the machining process advances from the rough cutting through the medium finish to the finish.

The spindle's rotational speed coefficient C is a proportional constant term serving as a conversion coefficient for obtaining the unit (rpm) of the spindle's rotational speed S from the unit (mm) of the tool diameter and the unit (m/min.) of the standard cutting speed V. The standard cutting speed V is a value representing a cutting velocity determined depending on the configuration of the end mill or the milling cutter and the characteristics of the material, that is, a value representing a peripheral velocity of the tool.

Therefore, (K·C·V/E) in the above expression (1) is a first part of function independent of the material of the workpiece, of which, the rotational speed ratio K is a variable (first element) dependent exclusively on the machining process, while the standard cutting speed V and the tool diameter E are variables (second element) independent of the tool. A second part of function dependent on the material of the workpiece is only the correction value W to be set depending on the material of the workpiece.

The function for determining a tool feed speed F (m/min.) is given as:

$$F=(K' \cdot V') \cdot W' \qquad (2)$$

where K' represents a feed speed ratio to be adjusted according to machining processes including rough machining, medium finish and finish (absolute number); V', standard feed speed defined based on the characteristics of the configuration or the material of the end mill or the milling cutter (m/min.); and W', represents a correction value corresponding to the material of the workpiece.

(K'·V') in the expression (2) is a first part of function independent of the material of the workpiece, of which, the feed speed ratio K' is a variable (first element) dependent exclusively on the machining process, while the standard feed speed V' is a variable (second element) dependent exclusively on the tool. A second part of function dependent on the material of the workpiece is the correction value W' to be set in accordance with the material of the workpiece.

Described below is a first embodiment in which the function for determining a machining condition is divided into a first part of function independent of the material of a workpiece and the second part of function dependent on the material of the workpiece, and the first part of the function is preserved together with a machining program when creating the machining program by the NC automatic programming system 100 while the second part of function is set into the controller 10 of the NC machine tool when executing the machining program, thereby synthesizing the first part of function and the second part of function to determine the machining condition.

Figure 4:
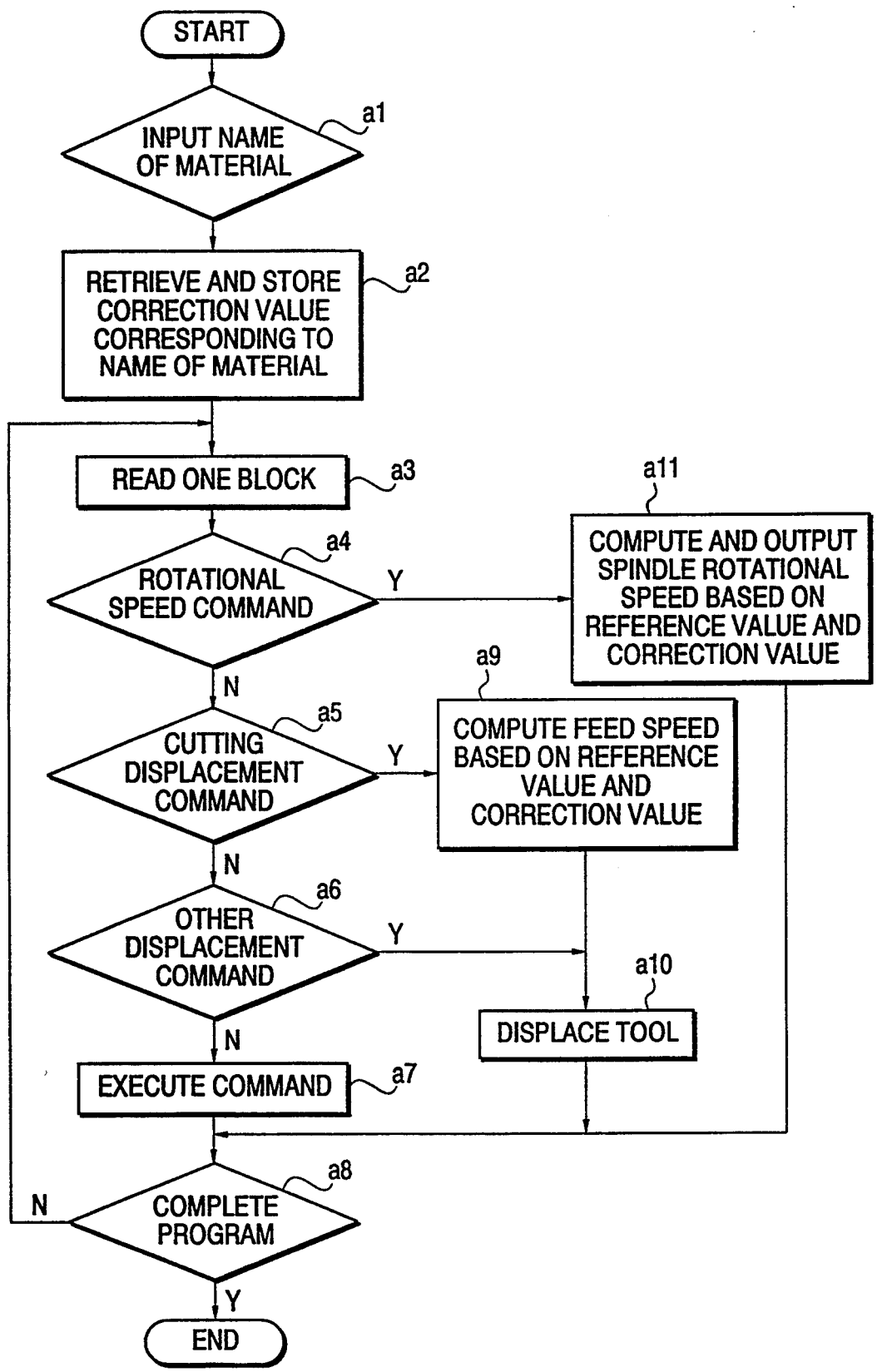
FIG. 4 is a flow chart showing "machining process at the change of materials" by use of the controller of the NC machine tool in accordance with a first embodiment of the present invention.

In this embodiment, the ROM 12 of the controller 10 in the NC machine tool includes, as shown in FIG. 3b, a correction file storing a plurality of correction values W and W' corresponding to the materials of the workpieces, as well as a system program for processing a machining program based on the "machining process adapted to the change of materials", as shown in FIG. 4.

Creation of a machining program by the NC automatic programming system 100 comprises the step of directly coding through the keyboard 103 a rotational speed of the spindle driving tools such as the end mill, tool displacement commands such as cutting feed or fast feed, and interpolating commands and coordinate data for the tool path in terms of NC language. Conventionally, the rotational speed, the tool cutting speed and the like have been programmed corresponding to the material of the workpiece specifically selected in advance. In this embodiment, however, a rotational speed ratio K and a feed speed ratio K' are determined corresponding to the machining processes including rough machining, medium finish and finish, and standard cutting speed V, a tool diameter E and a standard feed speed V' are determined corresponding to the tool used, whereby the first part of function (K·C·V/E) for the spindle rotational speed S and the first part of function (K'·V') for the tool feed speed F are calculated, and thus obtained values are used as reference values of the spindle rotational speed and the tool cutting feed speed for programming.

The reference values of the spindle rotational speed and cutting feed speed coded together with the machining program are outputted to the floppy disk 111 and the punch tape on completion of programming, and are preserved with the machining program.

When the floppy disk 111 or the punch tape preserving a machining program therein is loaded into the controller 10 of the NC machine tool, and the controller 10 set to "material change machining" mode is started after mounting the workpiece to be machined on the table of the machine tool, the CPU 11 executes the processing as shown in the flowchart of FIG. 4.

In Step a1, the CPU 11 causes the CRT/MDI unit 70 to display a message questioning the operator on the material of the workpiece to be machined, and enters a standby mode waiting for the input of a material name by the operator.

When the operator operates the keyboard of the CRT/MDI unit 70 to input the material name of the workpiece to be machined, the CPU 11 detects this operation through the judgment processing in Step a1 to advance to Step a2. The CPU 11 retrieves in Step a2 correction files, shown in FIG. 3b, to find the correction values W and W' corresponding to the inputted material name, or the values of the second part of function dependent on the material of the workpiece, and stores them.

Then, the CPU 11 reads in Step a3 one block of a machining program supplied through the floppy disk 111 or the punch tape to judge whether the block is associated with the spindle rotational speed command (Step a4), or with the tool cutting displacement command (Step a5), or with the displacement command for fast feed with respect to approach or retreat (Step a6).

If it is judged in Step a4 that latest read block is associated with a spindle rotational speed command, then the CPU 11 advances to Step a11. In this step, the reference values (K·C·V/E) of the spindle rotational speed stored within the machining program in response to the rotational speed command, or the values of the first part of function for determining the spindle rotational speed, are multiplied by the correction values W constituting the second part of the function detected and stored in Step a2 to find the spindle's rotational speed S according to the material of the workpiece to be machined to output it to the spindle control circuit 60. The CPU 11 leaves the spindle rotational speed S (rpm) unchanged until new spindle rotational speed command is read from the machining program imparted through the floppy disk 111 or the punch tape.

If it is judged in Step a5 that latest read block is associated with a tool cutting displacement command, the CPU 11 advances to Step a9, in which reference values (K'·V') of a cutting feed speed specified during the processing program in response to the cutting displacement command, or the values of the first part of function for determining the cutting feed speed, are multiplied by correction values W' constituting the second part of function detected and stored in Step a2 to find the cutting feed speed F corresponding to the material of the workpiece to be machined to output distribution pulses to the shaft control circuits 30 to 34 associated with respective shafts. The CPU 11 controllably drives in Step a10 the servomotors 50 to 54 associated with the respective shafts by way of the respective servo amplifiers 40 to 44 so that the tool is displaced at tool cutting feed speed F.

If it is judged in Step a6 that latest read block is associated with the approach or retreat of the tool, the tool is allowed to be displaced at a feed speed preset in Step a10, since any actual cutting work is not performed, and thus there is no need of considering the material of the workpiece. If in Step a6 code irrelevant to the machining conditions is read, the CPU advances to Step a7, in which the same processing as the previous processing is performed in response to these commands.

Then, the CPU 11 reads each block of the machining program to repeat the same processing as the above until a code representing the program end is detected from the machining program imparted through the floppy disk 111 or the punch tape.

As described above, in the first embodiment, only the first part of function dependent on the material of the workpiece in the function determining machining conditions is preserved together with the machining program, whereas the second part of function independent of the material of the workpiece is allowed to be inputted into the controller 10 of the NC machine tool to determine the machining conditions when initiating actual machining.

According to the first embodiment described above, there can be established machining conditions suitable for the material to be machined without altering the initial machining program preserved in the floppy disk 111 or the punch tape. It is therefore possible to freely create a machining program even at the stage where the material of the workpiece is not specified. The initial machining program created based on the conditions such as the product configurations, machining processes, tools to be used, etc. is preserved intact as a source program. Therefore, even when it has become necessary to alter the material of the workpiece to be machined after the machining program has been completed, the machining can be executed according to proper machining conditions suiting the newly selected material, without remaking the machining program, by simply having the operator specify the material before starting actual machining.

According to the first embodiment, the operator selects the name of the material of the workpiece to set the correction values W and W' into the controller 10; however, the operator may directly input the correction values through the keyboard of the CRT/MDI unit 70.

Instead of directly coding a program using an NC language in the stage of creating a machining program with the NC automatic programming system 100, the operator may create the machining program on an interactive basis using the interactive function of the NC automatic programming system 100.

Figure 5:
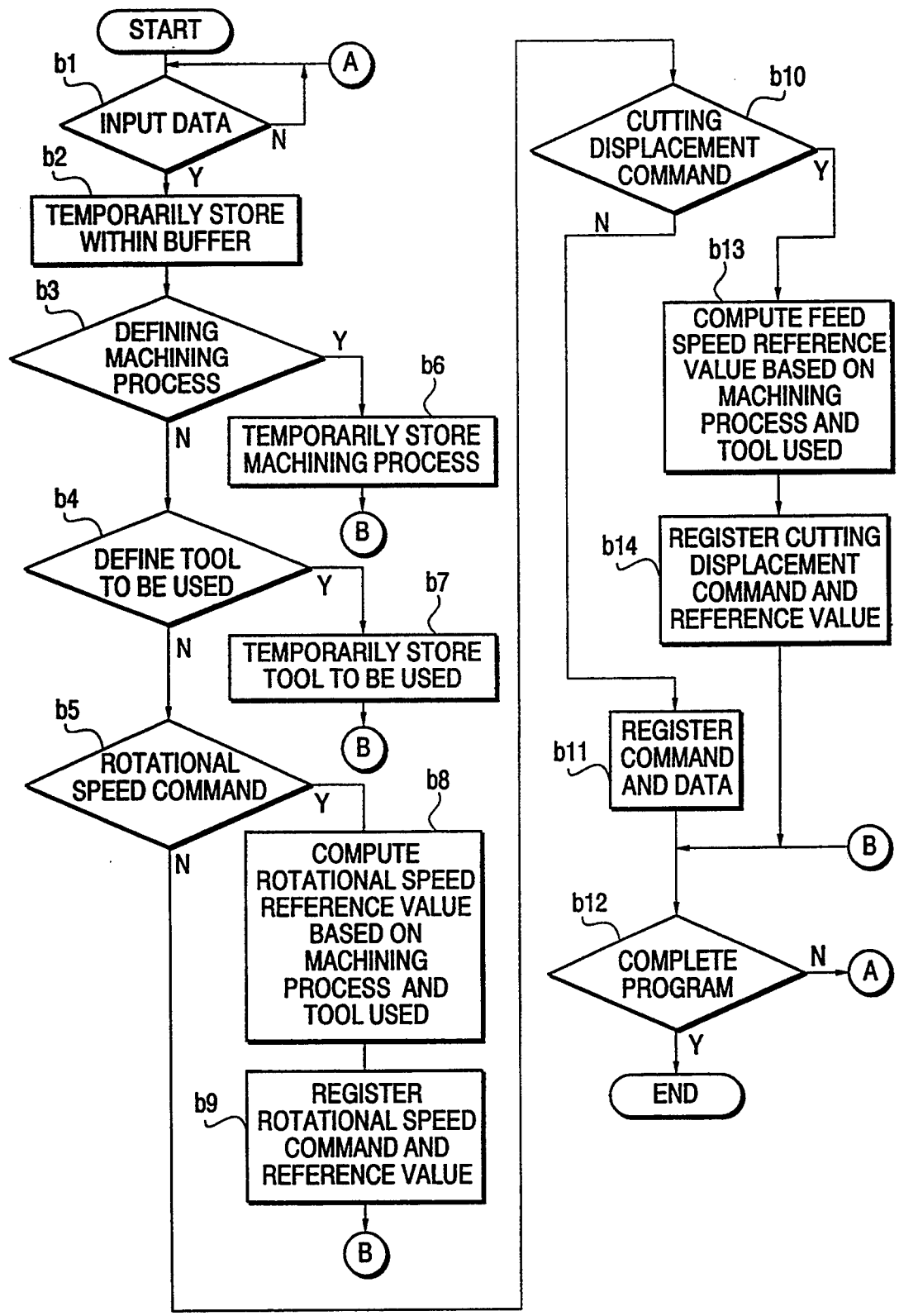
FIG. 5 is a flow chart showing "machining definition processing" by use of the NC automatic programming system in accordance with a second embodiment of the present invention.

FIG. 5 illustrates a second embodiment of the present invention showing a method for creating a machining program using the interactive function of the NC automatic programming system 100.

In this embodiment, the ROM 107 stores a file (FIG. 3c) storing a plurality of rotational speed ratios K and feed speed ratios K' corresponding to various machining processes, a file (FIG. 3d) storing a standard cutting speed V, a tool diameter E and a standard feed speed V' corresponding to the name of a tool used, and parameters (FIG. 3a) of spindle's rotational speed coefficient C. Also, a machining process and a tool to be used are selected on an interactive basis, thereby automatically calculating reference values of the spindle's rotational speed and cutting feed speed constituting the first part of function for being written into the machining program.

When the operator operates the keyboard 103 or the tablet 109 to select a system program for machining definition, the CRT 104 displays guidance messages comprising definition of a machining process, definition of a tool to be used, and setting of a cutting direction and an area to be cut in the mentioned order so that the operator can input data according to this order.

Referring now to the flowchart in FIG. 5, there will be described "machining definition processing" to be executed by the CPU 101 of the automatic NC programming system 100.

In Step b1, the CPU 101 first displays a message urging data input on the display of the CRT/MDI unit 104 to enter a standby mode waiting for the input operation by the operator.

When the name of a machining process is inputted through the operation of the keyboard 103 or the tablet 109 by the operator, the CPU detects this operation in Step b1 to proceed to Step b2. The CPU 101 temporarily stores input data in a buffer in Step b2, and then judges whether the data are associated with the definition of a machining process or not in Step b3. With the input of the name of the machining process in this case, the CPU 101 advances to Step b6 where the name of the machining process, which has been set by this operation, is temporarily stored for retention in a process storage register, and, through Step b12 for judgment processing, returns to Step b1 to wait for the input of the name of a tool to be used.

When the operator selectively inputs the name of the tool to be used, the CPU 101 detects this operation through the judgment processing in Step b1, and proceeds to Step b2 where input data are temporarily stored in the buffer. Then the CPU 101 executes the judgment processing in Step b3 in the same manner as the above. Since the result of judgment is "false" in this case, the CPU 101 advances to Step b4 to judge whether latest inputted data is the name of the tool to be used. Since result of judgment is "true" in Step b4, the CPU 101 in Step b7 temporarily stores the name of the tool to be used, which has been set by this operation in a tool name storage register, and, after executing judgment processing in Step b12 returns to Step b1 to wait for setting of the cutting direction and cutting area by the operator.

From step b1 on, when the operator inputs a spindle rotation command or a cutting command through the keyboard 103 or the tablet 109 after designating the cutting direction and cutting area, the CPU 101 detects this operation through the judgment processing in Step b1, and temporarily stores input data in a buffer (Step b2) to execute the judgment processings in Steps b3 and b4 in the same manner as the above. Since the result of judgment in Step b4 is "false" in this case, the CPU 101 judges whether latest input data is the spindle rotation command (Step b5) or the cutting command (Step b10).

Then, if it is judged in Step b5 that the latest input data is for the spindle rotation, the CPU 101 advances to Step b8. In step b8, based on the name of a machining process being now stored within the process storage register, a rotational speed ratio K corresponding to the machining process is detected from the file shown in FIG. 3; based on the name of a tool to be used being now stored within the tool name storage register, a standard cutting speed V and a tool diameter E corresponding to the tool are detected from the file shown in FIG. 3d; and, based on these values, parameters of the spindle's rotational speed coefficient C and the expression (1), there are found reference values (K·C·V/E) of the spindle's rotational speed constituting the first part of function. The CPU 101 further advances to Step b9 where the reference values of the spindle's rotational speed obtained in Step b8 are stored in the RAM 102 as a machining program together with the spindle rotation command.

If it is judged in Step b10 that the latest input data are associated with the cutting command, then the CPU 101 advances to Step b13. In step b13, based on the name of a machining process being now stored within the process storage register, a feed speed ratio K' corresponding to the machining process is detected from the file shown in FIG. 3c; based on the name of a tool to be used being now stored within the tool name storage register, a standard feed speed V' corresponding to the tool is detected from the file shown in FIG. 3d; and, based on these values and the expression (2), there are found reference values (K'·V') of the cutting feed speed constituting the first part of the function. The CPU 101 further proceeds to Step b14 where the reference values of the cutting feed speed obtained in Step b13 are stored in the RAM 102 as a machining program together with the cutting command.

When commands or data other than those for definition of machining process, tool to be used, spindle rotation and cutting displacement are inputted, or when if the results of judgments in Steps b3 through b5 and Step b10 are all "false", the CPU 101 stores these commands or data in the RAM 102 as a part of the machining program in step b11.

From step b11 on, the CPU 101 repeats the above processing each time the operator operates the keyboard 103 or the tablet 109 for the input of data. Finally, after completing the process definition, when a definition completion key on the keyboard 103 is operated by the operator, the CPU detects this operation through the judgment processing in Step b1, and stores it as input data (Step b2). Then, after going through the judgment processing in Steps b3 to b5 and Step b10, a program end code is stored in the RAM 102 (Step b11) to complete the process definition by the judgment in Step b12. Then, the commands or data being stored in the RAM 102 through the preceding operations are collectively converted by an operating system of the system program in order to be outputted to the floppy disk 11, punch tape or the like.

The processing to be performed after loading the floppy disk 111 or the punch tape preserving a machining program therein into the controller 10 of the NC machine tool is substantially the same as that in the first embodiment described above.

In both the first and second embodiments, only the part of function relating to the machining condition independent of the material of the workpiece is preserved integrally with a machining program when creating the machining program by the automatic NC programming system 100, whereas the part of function dependent on the material of the workpiece is separately inputted into the controller 10 when initiating the machining, so that a machining condition for each block is created for the execution of machining each time one block of machining program is read.

Prior to the actual machining, the previously prepared source program may be read into the NC automatic programming system 100 in order to newly create a different machining program which is associated with the specific machining conditions suited for the workpiece of specific material and is capable of executing the machining in the fashion similar to that by the original source program while maintaining the original source program intact. Furthermore, the machining conditions stored in the source program may be rewritten according to the material of the workpiece.

Figure 6:
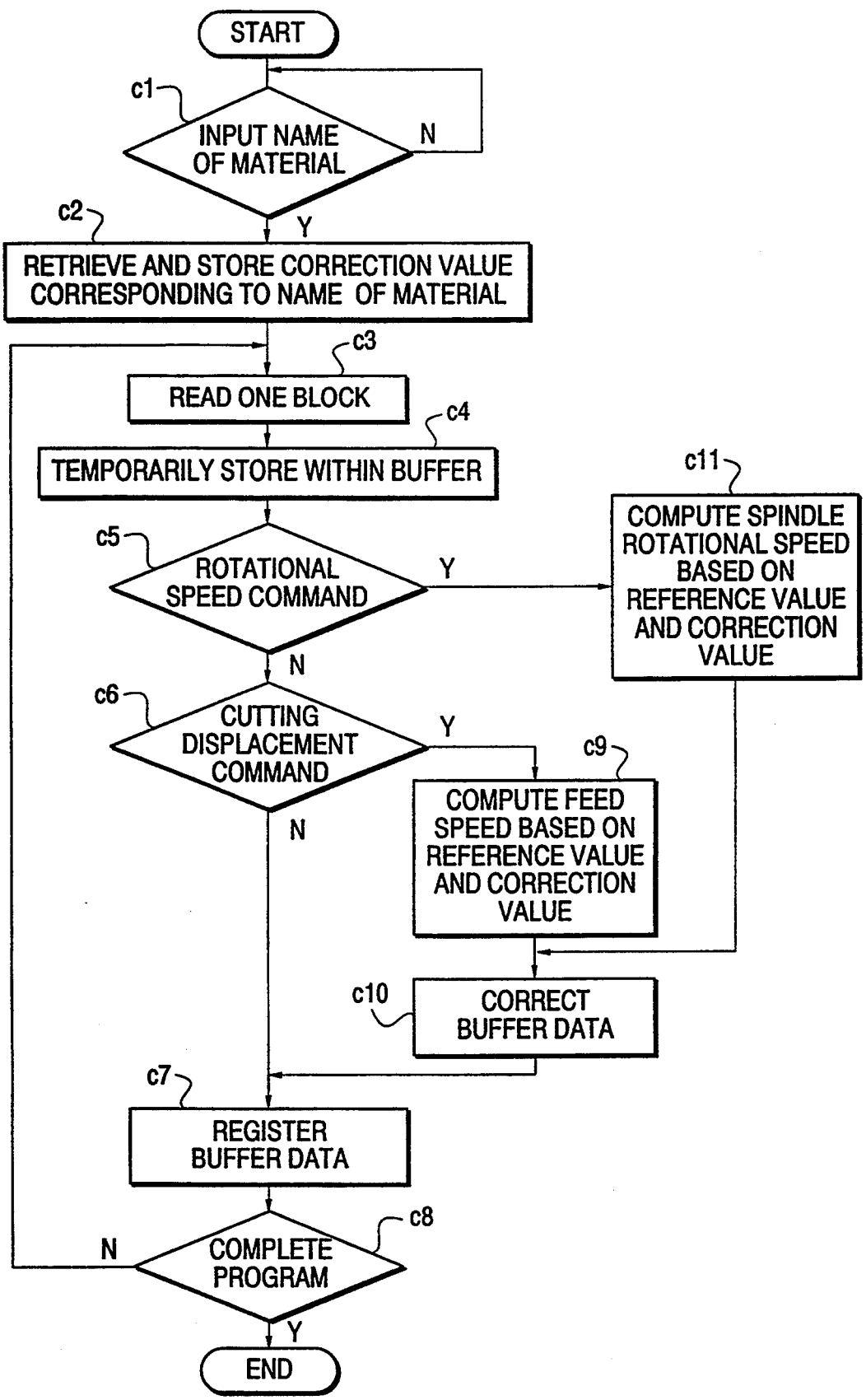
FIG. 6 is a flowchart showing "machining program modification processing" by use of the NC automatic programming system in accordance with a third embodiment of the present invention.

Referring now to FIG. 6, there will be described a third embodiment for executing the above processing using the NC automatic programming system 100.

In this embodiment, the ROM 107 stores a correction file (FIG. 3b) for storing a plurality of correction values W and W' corresponding to various materials of the workpiece in addition to the file (FIG. 3c) for storing a rotational speed ratio K and a feed speed ratio K' corresponding to various machining processes and the file (FIG. 3d) for storing a standard cutting speed V, a tool diameter E and a standard feed speed V' corresponding to the name of a tool to be used. Although the processing with respect to the creation of the source program itself is the same as those in the first and second embodiments, the processing in the third embodiment differs in that the source program is read into the NC automatic programming system 100 before executing the machining program to newly create a machining condition corresponding to a specific material of the workpiece through the processing by the NC automatic programming system 100, thereby enabling the new machining condition to be outputted to the floppy disk 111, the punch tape or the like together with the machining program.

First, the floppy disk 111 storing the previously prepared initial source program is loaded into the disk controller 108 of the NC automatic programming system to activate a routine for "machining program modification processing" shown in FIG. 6. Then, the CPU 101 causes the CRT 104 to display on its screen a message questioning the material of the workpiece to be machined, and enters a standby mode waiting for the input of a material name by the operator.

When the operator operates the keyboard 103 or the tablet 109 to input the material name of the workpiece to be machined, the CPU 101 detects this operation through the judgment processing in Step c1 to proceed to Step c2, wherein the file shown in FIG. 3b is retrieved to detect and store correction values W and W' corresponding to the inputted material name, that is, values constituting the second part of function dependent on the material of the workpiece.

Then, the CPU 101 reads in Step c3 one block of the source program preserved in the floppy disk 111, that is, one block of the initial machining program preserving as a machining condition only the first part of function independent of the material of the workpiece, stores the one block in a buffer in Step c4, and judges whether the read block is associated with the rotational speed command for spindle in Step c5 or associated with the tool cutting displacement command in Step c6.

If latest read block is associated with the rotational speed command for spindle (Step c5), the CPU 101 multiplies reference values (K·C·V/E) of the spindle's rotational speed, designated within the source program corresponding to this rotational speed command, that is, values of the first part of function forming the spindle rotational speed, by a value of correction value W constituting the second part of function to find a spindle rotational speed S corresponding to the material of the workpiece to be machined, whereby the data content within the buffer is modified (Steps c11 and c10). Then the CPU 101 stores thus modified spindle rotational speed S into a different storage area of the RAM 102 together with the spindle rotational speed command (Step c7).

If latest read one block is associated with the tool cutting displacement command (Step c6), the CPU 101 acts to multiply reference values (K'·V') of the cutting feed speed, designated within the source program corresponding to this cutting displacement command, that is, values of the first part of the function forming the cutting feed speed, by a value of the correction value W' constituting the second part of the function to find a cutting feed speed F corresponding to the material of the workpiece to be machined, whereby the data content within the buffer are modified (Steps c9 and c10). Then, the CPU 101 stores thus modified value of the cutting feed speed F within a different storage area of the RAM 102 together with the cutting displacement command (Step c7).

In the case where there have been read fast feed commands for approach or retreat, having no relation to the actual cutting work, or codes, unrelated to the machining condition, or, if the result of judgment in Step c6 is "false", these data are stored intact in a different storage area of the RAM 102 without any modification (Step c7).

Afterwards, the CPU 101 reads the initial machining program by block until a program end code is detected in Step c8 from the source program supplied through the floppy disk 111 or the punch tape, and repeats the same processing as the above to create within the RAM 102 a new machining program with a machining condition set therein corresponding to the material of the workpiece inputted through the processing in Step c1, thereby finally being outputted to the floppy disk 111, the punch tape or the like.

In the third embodiment, a previously prepared source program is read into the NC automatic programming system 100 for modification so that a machining conditions corresponding to a specific material of the workpiece are determined with the original source program maintained intact when newly creating separate machining program capable of executing a machining in the fashion similar to that of the original source program. Thus, the third embodiment requires no special processing such as multiplying correction values in executing machining operation through the controller 10 of the NC machine tool, since proper machining action corresponding to the material of the workpiece can be obtained by simply loading into the controller 10 the punch tape or the floppy disk 111 outputted from the NC automatic programming system 100.

Furthermore, within the punch tape or the floppy disk 111 there is preserved intact a source program retaining only values of the first part of the function independent of the material of the workpiece as a machining condition, and hence when the material of the workpiece is required to be changed again, there can be simply obtained another machining program including a machining condition corresponding to a new material of the workpiece by again carrying out the processing as shown in FIG. 6. Instead of newly creating a machining program including a new machining condition corresponding to a different material of the workpiece, the machining condition itself of the source program may possibly be rewritten in the above processing.

In the first and second embodiments as are described hereinabove, only the values of the first part of the function are preserved with a machining program through the manual or automatic setting when creating the machining program by the NC automatic programming system 100, while the second part of the function is set into the controller 10 of the NC machine tool at the stage of executing the machining program, to thereby synthesize the first and second parts of the function so that the NC machine tool is controllably driven according to thus produced machining condition.

In the third embodiment, prior to machining, a source program storing only the values of the first part of the function is read into the NC automatic programming system 100 to perform reprocessing, thereby determining a machining condition corresponding to the specific material of workpiece with source program maintained intact so as to newly create another machining program capable of executing the machining in the fashion similar to that of the original source program. Thus created machining program is outputted to the floppy disk or the punch tape, which in turn is loaded into the controller 10 to perform machining. In any embodiment, the above processing can be executed by the controller 10 alone as long as the controller 10 itself incorporates the functions of the NC automatic programming system 100.

We claim:

1. A method of creating machining conditions required in machining a workpiece by a numerically controlled machine tool, said method comprising the steps of:
   (a) dividing a function for determining said machining conditions into a first part independent of materials of the workpiece and a second part dependent on said materials of the workpiece;
   (b) determining said first part of the function when generating a machining program by an automatic programming system and preserving said first part of the function together with said generated machining program;
   (c) determining said second part of the function when executing said machining program by a numerical control system; and
   (d) synthesizing said first part of the function determined in said step (b) and said second part of the function determined in said step (c) to create machining conditions.

2. A method of creating machining conditions for a numerically controlled machine tool according to claim 1, wherein
   said machining conditions include a spindle rotational speed S, and
   a function for determining said spindle rotational speed S is expressed as:

$$S=(K \cdot C \cdot V/E) \cdot W$$

where K is a rotational speed ratio to be set in accordance with machining processes;
   C is a spindle rotational speed coefficient;
   V is a standard cutting speed in accordance with a tool to be used;
   E is a tool diameter; and
   W is a correction value in accordance with material of workpiece.

3. A method of creating machining conditions for a numerically controlled machine tool according to claim 2, wherein
   said first part of the function comprises $K \cdot C \cdot V/E$, while said second part of the function comprises W.

4. A method of creating machining conditions for a numerically controlled machine tool according to claim 1, wherein
   said machining conditions include a tool feed speed F, and
   a function for determining said tool feed speed F is expressed as:

$$F=(K' \cdot V') \cdot W'$$

where K' is a feed speed ratio to be set in accordance with machining processes;
   V' is a standard feed speed to be set in accordance with configuration and material of a tool; and
   W' is a correction value in accordance with material of workpiece.

5. A method of creating machining conditions for a numerically controlled machine tool according to claim 4, wherein
   said first part of the function comprises $K' \cdot V'$, while said second part of the function comprises W'.

6. A method of creating machining conditions for a numerically controlled machine tool according to claim 1, wherein
   said step (c) includes the steps of:
   (c1) providing said numerical control system with a correction file means for storing values of said second part of the function corresponding to a plurality of materials of the workpiece respectively; and
   (c2) determining said second part of the function corresponding to a material of the workpiece selected by the operator, referring to said correction file means.

7. A method of creating machining conditions for a numerically controlled machine tool according to claim 1, wherein
   said step (b) includes the steps of:
   (b1) dividing said first part of the function into a first element dependent on machining processes and a second element dependent on tools to be used;
   (b2) providing said automatic programming system with a first file means for storing values of said first element corresponding to a plurality of machining processes respectively, and a second file means for storing values of said second element corresponding to a plurality of tools respectively;
   (b3) finding said first and second elements corresponding to a machining process and a tool to be used respectively, which have been selected by the operator, referring to said first and second file means respectively; and
   (b4) generating said first part of the function by said automatic programming system based on said first and second elements obtained in said step (b3).

8. A method of creating machining conditions required in machining a workpiece by a numerically controlled machine tool, said method comprising the steps of:
   (a) dividing a function for determining machining conditions into a first part independent of materials of the workpiece and a second part dependent on said materials of the workpiece;
   (b) determining said first part of the function when generating a machining program by an automatic programming system and preserving said first part of the function together with said generated machining program;
   (c) inputting said machining program generated in said step (b) into said automatic programming system and setting said second part of the function into said automatic programming system before executing said machining program by a numerical control system; and (d) synthesizing said first part of the function determined in said step (b) and said second part of the function set in said step (c) to create machining conditions and outputting said machining conditions together with said machining program.

9. A method of creating machining conditions for a numerically controlled machine tool according to claim 8, wherein said step (c) includes the steps of:

(c1) providing said automatic programming system with a correction file means for storing values of said second part of the function corresponding to a plurality of materials of the workpiece respectively; and (c2) determining said second part of the function corresponding to a material of the workpiece selected by the operator with reference to said correction file means.

10. A method of creating machining conditions for a numerically controlled machine tool according to claim 8, wherein said step (b) include the steps of:

(b1) dividing said first part of the function into a first element dependent on machining processes and a second element dependent on tools to be used;

(b2) providing said automatic programming system with a first file means for storing values of said first element corresponding to a plurality of machining processes respectively, and a second file means for storing values of said second element corresponding to a plurality of tools respectively;

(b3) finding said first and second elements which correspond to a machining process and a tool to be used, respectively, selected by the operator, referring to said first and second file means; and (b4) generating said first part of the function by said automatic programming system based on said first and second elements obtained in said step (b3).

* * * * *

UNITED STATES PATENT AND TRADEMARK OFFICE
CERTIFICATE OF CORRECTION

PATENT NO. : 5,400,260
DATED : March 21, 1995
INVENTOR(S) : Matsumura et al

It is certified that error appears in the above-indentified patent and that said Letters Patent is hereby corrected as shown below:

Col. 1, line 39, delete "change" and insert --change,--

Signed and Sealed this

Twentieth Day of June, 1995

Attest:

BRUCE LEHMAN

Attesting Officer    Commissioner of Patents and Trademarks